(12) United States Patent
Hog

(10) Patent No.: US 6,496,344 B1
(45) Date of Patent: Dec. 17, 2002

(54) CIRCUIT FOR SUPPLYING A CONSUMER WITH ELECTRIC ENERGY

(75) Inventor: Norbert Hog, Buehl (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/381,057
(22) PCT Filed: Mar. 10, 1998
(86) PCT No.: PCT/DE98/00697
§ 371 (c)(1), (2), (4) Date: Dec. 1, 1999
(87) PCT Pub. No.: WO98/40949
PCT Pub. Date: Sep. 17, 1998

(51) Int. Cl.[7] ................................ H02H 3/24
(52) U.S. Cl. ....................................... 361/92
(58) Field of Search .................... 361/92, 78, 79, 361/86, 87; 318/139; 180/65.3; 307/39, 38; 320/5, 35, 20, 39, 31

(56) References Cited

U.S. PATENT DOCUMENTS

| 4,447,841 A | * | 5/1984 | Kent ......................... 361/18 |
| 4,916,328 A | * | 4/1990 | Culp, III ..................... 307/39 |
| 5,166,584 A | * | 11/1992 | Fukino et al. ............... 318/139 |
| 5,416,702 A | | 5/1995 | Kitagawa et al. |
| 5,714,866 A | * | 2/1998 | S et al. ........................ 220/5 |
| 5,722,911 A | * | 3/1998 | Ibaraki et al. ................ 477/3 |
| 5,991,677 A | * | 11/1999 | Kinugawa et al. ............ 701/50 |

FOREIGN PATENT DOCUMENTS

| DE | 39 36 638 | 3/1991 | |
| DE | 41 31 981 | 4/1993 | |
| EP | 0 461 432 | 12/1991 | |
| GB | 2158312 | * 11/1985 | ................... 361/92 |
| WO | 96 11817 | 4/1996 | |

* cited by examiner

Primary Examiner—Brian Sircus
Assistant Examiner—J. F. Duverne
(74) Attorney, Agent, or Firm—Kenyon & Kenyon

(57) ABSTRACT

The invention relates to a circuit for supplying a consumer (10) with electric energy provided by a battery (11). The battery voltage (Ub) is prevented from falling below a predetermined minimum voltage (Umin) by a regulator (18) which adjusts the battery voltage (Ub) to a predetermined minimum voltage (Umin) by influencing the average amount of energy which is provided to the consumer (10). Preferably, the inventive circuit is used in a motor vehicle.

30 Claims, 1 Drawing Sheet

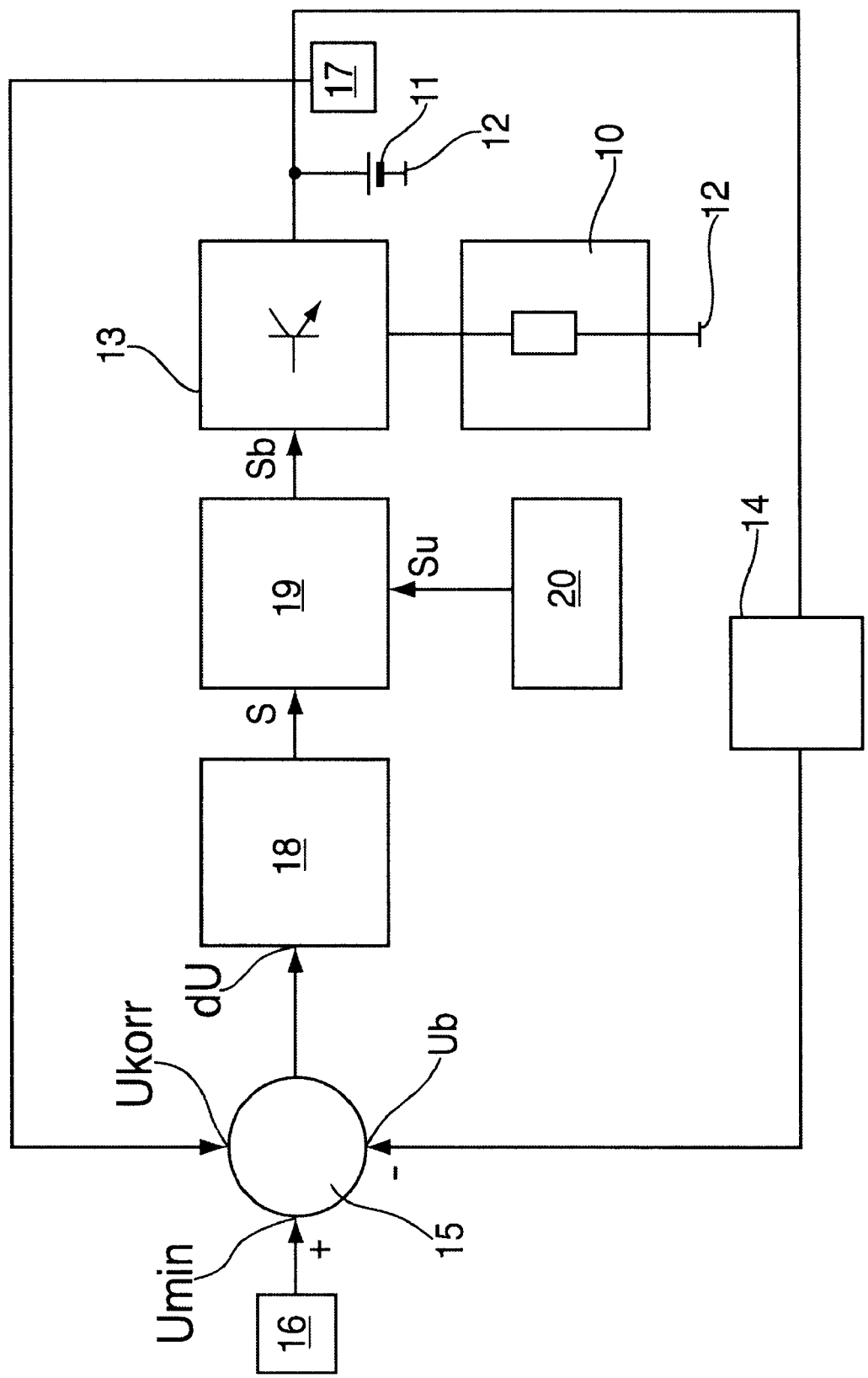

CIRCUIT FOR SUPPLYING A CONSUMER WITH ELECTRIC ENERGY

FIELD OF THE INVENTION

The present invention is based on a circuit arrangement for supplying electrical energy to a load.

BACKGROUND INFORMATION

German Patent Application No. 39 36 638 describes a circuit arrangement that ensures the supply of energy to electrical loads in an electrical system of a motor vehicle. By deactivating individual loads in controlled fashion, the vehicle voltage is prevented from dropping below a predefined value. This action ensures that the energy content of the motor vehicle battery is at least sufficient for a starting operation. In order to prevent excessively frequent activation and deactivation of individual loads when a threshold battery voltage value is reached, it is necessary to provide a hysteresis which ensures that after being deactivated, a load is not reactivated again until the voltage has risen by an amount equal to the hysteresis.

SUMMARY OF THE INVENTION

An object of the present invention is to provide a circuit arrangement for supplying electrical energy to a load that prevents the residual energy contained in a battery from dropping below a predefined quantity.

The circuit arrangement according to the present invention has the advantage that the energy stored in the battery can be made completely available for powering the loads until a predefined minimum battery voltage is reached. The fact that the circuit arrangement according to the present invention operates continuously prevents frequent complete activation and deactivation of the load.

The advantages are achieved by the fact that a controller is provided that regulates the battery voltage to the minimum battery voltage by delivering a manipulated variable, which defines the electrical power consumption of the load. A prerequisite is that the power of the load be controllable at least within predefined limits. If the circuit arrangement according to the present invention is arranged in a motor vehicle, such loads are, for example, a fan, an air conditioner, a refrigerator, a receiver of a remote control system or, for example, an alarm system. The minimum battery voltage that is to be defined is established in such a way that on the one hand the functionality of the load can still be maintained, and on the other hand a reserve still remains so that, for example in a motor vehicle, a starting operation can be performed.

A first advantageous embodiment provides for the power consumption of the load to be defined by a pulse-width modulation of the supply voltage of the load. The clock frequency is preferably defined in such a way that the load current flows as continuously as possible.

Another embodiment provides for the manipulated variable that defines the electrical power consumption of the load to be limited to a lower value. The limitation to a lower value can advisable in terms of the behavior of the load. Another considerable advantage is the fact that the voltage of the battery can largely be prevented from dropping below the predefined minimum battery voltage in the context of control fluctuations.

An advantageous embodiment provides for the minimum battery voltage to be influenced as a function of correction variables such as, for example, the battery temperature or the current flowing through the battery.

A preferred use of the circuit arrangement according to the present invention exists in a motor vehicle that has a vehicle electrical system with a battery. An air conditioner or at least one fan is provided, for example, as the load. A remote control system or an alarm system can also be provided as the load. These loads can be active while the vehicle is unoccupied, with no risk that the battery voltage will fall below the predefined minimum.

BRIEF DESCRIPTION OF THE DRAWINGS

The FIGURE illustrates a block diagram of a circuit arrangement according to the present invention for supplying electrical energy, made available by a battery, to a load.

DETAILED DESCRIPTION

The FIGURE shows a load 10 that is to be supplied with electrical energy, which is made available by a battery 11. Load 10 and battery 11 are connected to a circuit ground 12. Load 10 can be connected via an output stage 13 to battery 11.

The voltage at battery 11 is sensed by a voltage measuring device 14 and conveyed as battery voltage Ub to a summing point 15 that is contained in a control loop. Also conveyed to summing point 15 are a minimum battery voltage Umin that is made available by a minimum voltage setpoint generator 16, and a correction voltage Ukorr that is made available by a battery parameter measuring device 17.

Summing point 15 delivers a system deviation dU to a controller 18, which generates a manipulated variable S that is conveyed to a manipulated variable converter 19. Manipulated variable converter 19 has delivered to it a lower limit value Su that is made available by a limit value generator 20, and delivers a limited manipulated variable Sb to output stage 13.

The circuit arrangement according to the present invention operates as follows:

Load 10, which is supplied with electrical energy from battery 11, is intended to be capable of operating as long as possible without creating the risk of a deep discharge of battery 11. Battery 11 is arranged, for example, in a motor vehicle. When the engine is switched off, i.e. when the battery is not being recharged, provision must be made for there always to be enough energy remaining in battery 11 to start the engine.

Using the assumption that the average power consumption of load 10 is controllable at least within certain limits, the average power is defined in such a way that the battery voltage Ub is regulated to a predefined minimum battery voltage Umin. The control system thus attempts, while the battery is discharging and when the minimum battery voltage Umin is reached, to hold the battery voltage Ub for as long a period as possible at the value of the minimum battery voltage Umin, by lowering the average power of load 10.

To perform the control action, the voltage present at battery 11 is sensed by voltage measuring device 14 and is conveyed, as the actual value of the battery voltage Ub, to summing point 15, which is contained in a control loop. The setpoint of the control loop is made available by minimum voltage setpoint generator 16 as the minimum battery voltage Umin. Optionally, a correction is made which shifts the minimum battery voltage Umin at least slightly by way of the correction voltage Ukorr. The correction voltage Ukorr is made available by battery parameter measuring device 17, which senses, for example, the temperature of battery 11 or, for example, the discharge current flowing through battery 11. These parameters influence the energy that can be withdrawn from battery 11, and are therefore advantageously utilized to correct the initially predefined minimum battery voltage Umin. The minimum battery voltage Umin must be established at a value at which a compromise is struck between the maximum possible operating time of load 10 and the remaining minimum energy quantity in battery 11.

When the battery is completely charged, i.e. when the battery voltage Ub is much greater than the minimum battery voltage Umin, controller 18 defines the manipulated variable S at the maximum possible value, which is not modified further in manipulated value converter 19 and hence is conveyed unchanged to output stage 13 as the limited manipulated variable Sb. In this operating state, output stage 13 can be completely activated in order to supply load 10 with energy without limitation.

Controller 18 intervenes only when the system deviation dU has decreased to a value at which the battery voltage Ub approaches the battery voltage Umin. The manipulated variable S is then established, as a function of the algorithms defined in controller 18, at a value that causes output stage 13 to reduce the average power conveyed to load 10. Manipulated variable converter 19 can make the limited manipulated variable Sb available, for example, as a continuous signal that switches a transistor, contained in output stage 13, on or off in continuous operation. Manipulated variable converter 19 preferably creates limited manipulated variable Sb from the manipulated variable S as a pulse-width modulated signal that switches output stage 13 either completely on or completely off at the defined clock cycle.

As soon as it is ascertained by way of the system deviation dU that the battery voltage has fallen below the predefined minimum voltage Umin, the manipulated variable S and thus the limited manipulated variable Sb are defined in such a way that output stage 13 is completely switched off. The linear or high-frequency operating mode prevents the battery voltage from oscillating.

One possibility for preventing the battery voltage Ub from falling below the predefined minimum battery voltage Umin is to limit the manipulated variable S to the predefined lower limit value Su that is made available by limit value generator 20. The limited manipulated variable Sb that is made available by manipulated variable converter 19 therefore preferably exhibits a discontinuity point.

If the controller can no longer prevent the battery voltage from dropping even when the lower limit value Sn has been output, load 10 is completely deactivated. A complete deactivation of load 10 can also be provided for if a value of the limited manipulated variable Sb drops below a value that, for example, corresponds to 50% of the rated power of load 10.

In the case where the circuit arrangement according to the present invention is used in a motor vehicle, an air conditioner or at least one fan as a component of the air conditioner is provided, for example, as load 10. If interior temperatures are very high, the air conditioner or at least the fan can be activated, even if the motor vehicle is not running, without causing a risk of a deep discharge of battery 11. In the case of a utilization in a motor vehicle, further loads 10 can be provided that are activated even when the vehicle is not running. Loads of this kind are, for example, a receiver of a remote control system or, for example, an alarm system.

What is claimed is:

1. A circuit arrangement for supplying electrical energy from a battery to a load, comprising:
    an undervoltage deactivation system that deactivates the load when a battery voltage falls below a predefined minimum battery voltage, the undervoltage deactivation system including a controller, the controller regulating the battery voltage to the predefined minimum battery voltage by delivering a manipulated variable, the manipulated variable defining an average electrical power consumption of the load.

2. The circuit arrangement according to claim 1, wherein the manipulated variable includes a pulse-width modulated signal.

3. The circuit arrangement according to claim 1, wherein the manipulated variable is limited to a lower limit value, the load being deactivated below the lower limit value.

4. The circuit arrangement according to claim 1, further comprising a correcting unit for correcting the predefined minimum battery voltage as a function of operating parameters of the battery.

5. The circuit arrangement according to claim 4, wherein the operating parameters include a temperature of the battery.

6. The circuit arrangement according to claim 5, wherein the operating parameters further include a discharge current, the discharge current flowing through the battery.

7. The circuit arrangement according to claim 1, wherein the circuit arrangement is implemented in a motor vehicle.

8. The circuit arrangement according to claim 7, wherein the load includes an air conditioner.

9. The circuit arrangement according to claim 7, wherein the load includes one of a receiver of a remote control system and an alarm system.

10. A control arrangement to control a battery output to a load, comprising:
    an electrical parameter determining arrangement to determine an electrical parameter of the battery;
    a battery parameter determining arrangement to determine a battery parameter of the battery and to provide a correcting parameter;
    a setpoint arrangement to provide a minimum electrical parameter;
    a controller to provide a manipulated variable;
    a limit value arrangement to provide a limit value;
    a manipulated variable converter arrangement coupled to the controller and the limit value arrangement to receive the manipulated variable and the limit value, and being operable to provide a limited manipulated variable;
    an output stage arrangement coupled to the manipulated variable converter arrangement to receive the limited manipulated variable, and further coupled to the battery to control the battery output to the load; and
    a combining arrangement coupled to the battery parameter determining arrangement, the setpoint arrangement and the electrical parameter determining arrangement to receive the electrical parameter, the minimum electrical parameter and the correcting parameter, and being further coupled to the controller and being operable to provide a system deviation to the controller.

11. The control arrangement according to claim 10, wherein the battery parameter includes at least one of a temperature and a current.

12. The control arrangement according to claim 10, wherein the electrical parameter is a voltage.

13. The control arrangement according to claim 10, wherein the minimum electrical parameter is a minimum voltage.

14. The control arrangement according to claim 10, wherein the output stage arrangement includes a switching arrangement.

15. The control arrangement according to claim 10, wherein the output stage arrangement includes a transistor arrangement.

16. The control arrangement according to claim 10, wherein the output stage arrangement is operable to reduce an average power of the load.

17. The control arrangement according to claim 10, wherein the limited manipulated variable includes a pulse-width-modulated signal to control the output stage arrangement.

18. The control arrangement according to claim 10, wherein the correcting parameter includes a correcting voltage.

19. The control arrangement according to claim 10, wherein:

the battery parameter includes at least one of a temperature and a current;

the electrical parameter is a voltage;

the minimum electrical parameter is a minimum voltage;

the output stage arrangement is operable to reduce an average power of the load;

the limited manipulated variable includes a pulse-width-modulated signal to control the output stage arrangement; and the correcting parameter includes a correcting voltage.

20. The control arrangement according to claim 19, wherein the output stage arrangement includes a switching arrangement.

21. The control arrangement according to claim 19, wherein the output stage arrangement includes a transistor arrangement.

22. A control arrangement to control a battery output to a load, comprising:

a voltage determining arrangement to determine a voltage of the battery;

a battery parameter determining arrangement to determine a battery parameter of the battery and to provide a correcting voltage;

a minimum voltage arrangement to provide a minimum voltage;

a controller to provide a manipulated variable based on a system deviation;

a limit value arrangement to provide a limit value to limit the manipulated variable;

a manipulated variable converter arrangement to provide a limited manipulated variable based on the manipulated variable and the limit value; and an output stage arrangement to control the battery output to the load based on the limited manipulated variable.

23. The control arrangement according to claim 22, wherein the system deviation is based on the voltage, the minimum voltage and the correcting voltage.

24. The control arrangement according to claim 22, wherein:

the battery parameter includes at least one of a temperature and a current;

the output stage arrangement is operable to reduce an average power of the load; and the limited manipulated variable includes a pulse-width-modulated signal to control the output stage arrangement.

25. The control arrangement according to claim 24, wherein the output stage arrangement includes a switching arrangement.

26. The control arrangement according to claim 24, wherein the output stage arrangement includes a transistor arrangement.

27. A control arrangement to control a battery output to a load, the control arrangement comprising:

a parameter determining arrangement to determine at least one battery parameter;

a setpoint arrangement to provide a minimum value for at least one battery parameter;

a controller to provide a manipulated variable as a function of the at least one battery parameter and the minimum value;

a manipulated variable converter arrangement coupled to the controller to receive the manipulated variable, and being operable to provide a limited manipulated variable; and an output stage arrangement coupled to the manipulated variable converter arrangement to receive the limited manipulated variable, and further coupled to the battery to control the battery output to the load.

28. The control arrangement according to claim 27, wherein the at least one battery parameter includes at least one of a temperature and a current.

29. The control arrangement according to claim 10, wherein the at least one battery parameter includes a voltage.

30. The control arrangement according to claim 10, wherein the minimum value includes a minimum voltage.

* * * * *

UNITED STATES PATENT AND TRADEMARK OFFICE
CERTIFICATE OF CORRECTION

PATENT NO.    : 6,496,344 B1                                                Page 1 of 1
DATED         : December 17, 2002
INVENTOR(S)   : Norbert Hog It is certified that error appears in the above-identified patent and that said Letters Patent is hereby corrected as shown below:

<u>Title page,</u>
Item [57], ABSTRACT, please correct the ABSTRACT to read as follows:
-- A circuit arrangement that supplies electrical energy, made available by a battery, to a load. A battery voltage is prevented from falling below a predefined minimum battery voltage by a controller, which regulates the battery voltage to the predefined minimum battery voltage. The controller influences an average energy made available to the load. A preferred use of the circuit arrangement exists in a motor vehicle. --

Signed and Sealed this

Twenty-seventh Day of January, 2004

JON W. DUDAS
*Acting Director of the United States Patent and Trademark Office*